(12) United States Patent
Itagaki

(10) Patent No.: US 7,976,380 B2
(45) Date of Patent: Jul. 12, 2011

(54) SYSTEM AND METHOD FOR USING WAVELET ANALYSIS OF A USER INTERFACE SIGNAL FOR PROGRAM CONTROL

(75) Inventor: Nobutaka Itagaki, Tokyo (JP)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 621 days.

(21) Appl. No.: 11/502,007

(22) Filed: Aug. 10, 2006

(65) Prior Publication Data
US 2008/0045328 A1 Feb. 21, 2008

(51) Int. Cl.
A63F 9/24 (2006.01)
(52) U.S. Cl. .................. 463/23; 463/30; 463/36; 463/37
(58) Field of Classification Search .................... 463/23, 463/38, 25, 1, 3, 31, 20, 37, 30, 36
See application file for complete search history.

(56) References Cited

U.S. PATENT DOCUMENTS

| 4,332,566 | A | 6/1982 | Mazeski et al. |
| 5,377,100 | A | 12/1994 | Pope et al. |
| 5,583,795 | A | 12/1996 | Smyth |
| 5,772,508 | A | 6/1998 | Sugita et al. |
| 5,774,591 | A | 6/1998 | Black et al. |
| 5,944,530 | A | 8/1999 | Ho et al. |
| 6,450,820 | B1 * | 9/2002 | Palsson et al. ................ 434/236 |
| 6,597,739 | B1 * | 7/2003 | Li et al. .................... 375/240.19 |
| 6,827,579 | B2 | 12/2004 | Burdea et al. |
| 6,890,262 | B2 | 5/2005 | Oishi et al. |
| 6,913,536 | B2 | 7/2005 | Tomizawa et al. |
| 7,367,882 | B2 | 5/2008 | Fukutome |
| 7,488,294 | B2 | 2/2009 | Torch |
| 2002/0136435 | A1 | 9/2002 | Prokoski |
| 2006/0056509 | A1 | 3/2006 | Suino et al. |

FOREIGN PATENT DOCUMENTS

| JP | 9-22314 | 1/1997 |
| JP | 2000-296118 | 10/2000 |
| JP | 2005-032167 | 2/2005 |
| JP | 2005-245682 | 9/2005 |
| JP | 2005-312755 | 11/2005 |

* cited by examiner

Primary Examiner — Dmitry Suhol
Assistant Examiner — Brandon Gray

(57) ABSTRACT

Advantage is taken of the fact that as a player tires, the high frequency components of the player's movement typically decreases in comparison with the low frequency components of the player's movement. By analyzing the frequency components of the player's motion, as obtained from signals generated by the motion input device, the system is able to determine changes in a player's response level and change the game accordingly. In one embodiment, wavelet analysis of an input device signal is used to control or adjust a program.

4 Claims, 3 Drawing Sheets

SYSTEM AND METHOD FOR USING WAVELET ANALYSIS OF A USER INTERFACE SIGNAL FOR PROGRAM CONTROL

CROSS-REFERENCE TO RELATED APPLICATIONS

The present application is related to concurrently filed, co-pending, and commonly-assigned U.S. patent application Ser. No. 11/502,298, entitled "SYSTEM AND METHOD FOR USING IMAGE ANALYSIS OF USER INTERFACE SIGNALS FOR PROGRAM CONTROL," the disclosure of which is hereby incorporated herein by reference.

TECHNICAL FIELD

The present invention relates generally to interactive computer systems and methods, and more particularly to systems and methods for using wavelet analysis of a user interface signal to control a program.

BACKGROUND OF THE INVENTION

Electronic games using computers, game consoles or hand held consoles typically employ an input device, a processor, and a visual display. The input device can be a mouse, joystick or other form of controller which allow the player to input responses into the processor. The processor can be a part of a computer system or it can be a dedicated game system, such as XBOX® and PLAYSTATION® game systems. The processor communicates with the display to show visual and/or audio images of the game.

These electronic games typically have different levels of play in order to provide a level of play which is entertaining for the player. For many games, the level of play is selected by the user prior to playing the game, and changing the level of play will require the user to restart the game. A player will often have to try out a variety of levels before finding a level which is suitable for her level of play.

Games typically place the player in situations where quick and/or agile response is required and a player's score is typically reflective of his/her ability to respond quickly to the challenges presented by the game. In many situations, a mouse, joystick or a controller is used to relay positional information which is used by the game to move an object on the display.

Playing at an appropriate level of play will ensure that the player is challenged by the game, and minimizes the risk of overwhelming or boring the player. However, when user skill levels must be set before a game is started there is not a convenient way in which the user can adjust the skill level short of restarting the game. Often, the user does not even know that the skill level is wrong for that user.

BRIEF SUMMARY OF THE INVENTION

Advantage is taken of the fact that as a player tires, the high frequency components of the player's movement typically decreases in comparison with the low frequency components of the player's movement. By analyzing the frequency components of the player's motion, as obtained from signals generated by the motion input device, the system is able to determine changes in a player's response level and change the game accordingly. In one embodiment, wavelet analysis of an input device signal is used to control or adjust a program.

The foregoing has outlined rather broadly the features and technical advantages of the present invention in order that the detailed description of the invention that follows may be better understood. Additional features and advantage of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the inventions as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following description taken in conjunction with the accompanying drawings, in which.

DETAILED DESCRIPTION OF THE INVENTION

Figure 1:
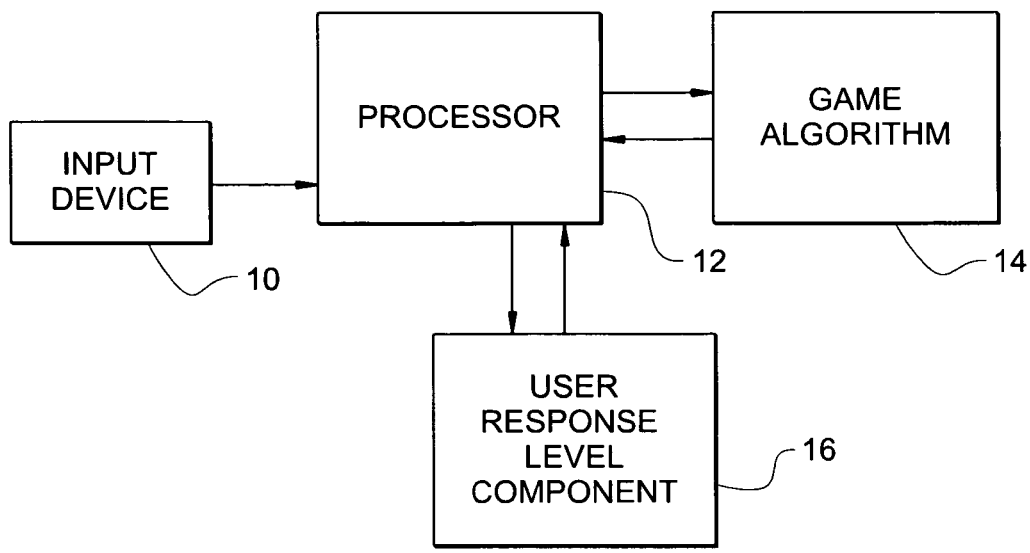
FIG. 1 is a diagram of one embodiment of the present invention.

As shown in FIG. 1, one embodiment of the present invention includes a user interface, such as device 10, which communicates with processor 12. The program code or algorithm for a game program may be stored in a memory device, such as memory 14, and executed by processor 12. Response level component 16 may be integrated into the program code, or it can be integral to processor 12.

User interface 10 may be a computer mouse, a game controller, a joystick, or any other device through which the player is able to input his/her actions into the processor 12. Processor 12 may include memory devices, microprocessors, and any components which are utilized to execute the program code for a game program. The processor system may be a part of a computer system, a video game console, or a hand held gaming device.

The high frequency component of a player's movement (as provided by user interface 10) can be used as an indicator of a player's response level. For example, predominant high frequency components may suggest a particularly skilled player with a high response level. In one embodiment, user response level component 16 uses wavelet technology to determine a player's response level via analysis of the signal from user interface 10. Changes of a player's response level (i.e., changes in the frequency components or the user input) during game play can be used to change a game program aspect, for example the play difficulty could be adjusted. Other means for monitoring a player's response level may also be incorporated in embodiments of the present invention.

It is known from Fourier theory that a signal can be expressed as the sum of a possibly infinite, series of sines and cosines. This sum is also referred to as a Fourier expansion. The disadvantage of a Fourier expansion however is that it has only frequency resolution and no time resolution. This means that although it might be able to determine all the frequencies present in a signal, it may not be known when the frequencies are present. To overcome this problem solutions have been developed which are more or less able to represent a signal in the time and frequency domain at the same time. The idea behind these time-frequency joint representations is to cut the signal of interest into several parts and then analyze the parts separately.

The wavelet transform or wavelet analysis presents a solution to overcome the shortcomings of the Fourier transform. In wavelet analysis the use of a fully scalable modulated window solves the signal-cutting problem. The window is shifted along the signal and for every position the spectrum is calculated. Then this process is repeated many times with a slightly shorter (or longer) window for every new cycle. In the end the result will be a collection of time-frequency representations of the signal.

FIGS. 2A through 2F illustrate one example 10 of wavelet transformation. Wavelets, wavelet analysis and wavelet transforms refers to the representation of a signal in terms of a finite length or fast decaying oscillating waveform (known as the mother wavelet). As discussed on http://en.wikipedia.org, this waveform is scaled and translated to match the input signal. In formal terms, this representation is a wavelet series, which is the coordinate representation of a square integrable function with respect to a complete, orthonormal set of basis functions for the Hilbert space of square integrable functions. In general, wavelet transformation, W of function $f(x)$ can be described as:

$$(W_\psi f)(b, a) = \int_{-\infty}^{+\infty} \frac{1}{\sqrt{|a|}} \overline{\psi\left(\frac{x-b}{a}\right)} f(x) dx \quad \text{Equation (1)}$$

where $\psi$ is a mother wavelet function, "a" and "b" are scaling factors. The formation above is not convenient, because it is a continuous wavelet transformation (CWT) and requires infinite integration. So for actual operation, discrete wavelet transformation (DWT) is useful. The equation for a DWT can be shown as:

$$(W_\psi f)(2^{-j}k, 2^{-j}) = d_k^{(j)} = 2^j \int_{-\infty}^{+\infty} \overline{\psi(2^j x - k)} f(x) dx \quad \text{Equation (2)}$$

In short, function $f(x)$ can be described with a series of mother wavelet functions $\psi$ and wavelet transformed coefficient $d_k^{(j)}$, such as:

$$f(x) \approx \sum_j \sum_k d_k^{(j)} \psi(2^j x - k) \quad \text{Equation (3)}$$

This also can be described as:

$$g_j(x) = \sum_k d_k^{(j)} \psi(2^j x - k) \quad \text{Equation (4)}$$

$$f(x) \approx g_{-1}(x) + g_{-2}(x) + \ldots \quad \text{Equation (5)}$$

This process is known multi-resolution analysis (MRA).

Figure 2A:
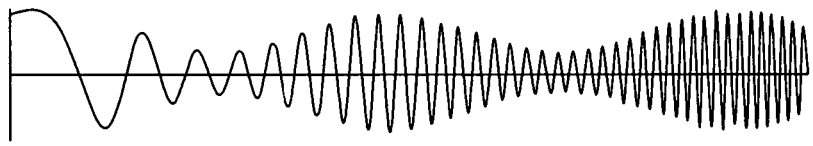
FIGS. 2A through 2F illustrate one example of wavelet transformation that may be employed by one or more embodiments of the present invention.

FIG. 2A shows an original function $f(x)$. FIGS. 2B through 2F are wavelet transformed functions, ($d_k^{(j)}$).

Figure 2B:
Figure 2C:
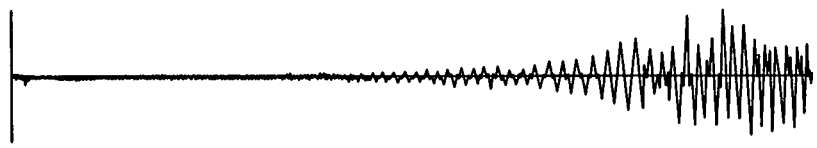
Figure 2D:
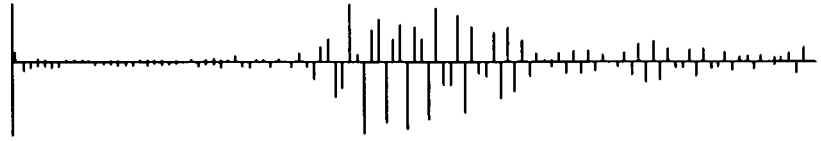
Figure 2E:
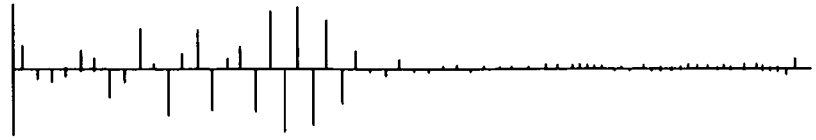
Figure 2F:
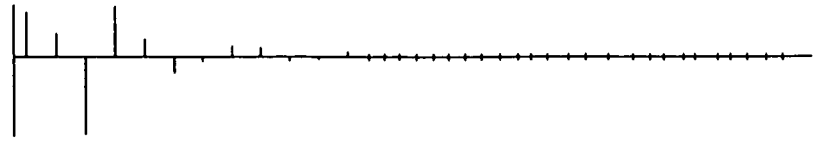

The function $f(x)$ in FIG. 2A is an ideally artificial function and it is not an actual game data. In the case shown, there is no high frequency component at the beginning (left). FIGS. 2B and 2C may include a noise component. For example, USB interface has a refresh rate of 8 ms, which is very short in comparison to human controllable time. So the high frequency component such as 8 ms may be an electrical noise. FIG. 2F shows low frequency components and is thus a significant signal for use in game control. Other significant signals for player level control are, for example, shown in FIGS. 2D and 2E.

Assume a player's input function, $f(t)$ and a player's level function, $g(t)$. Then $f(t)$ is transformed with a wavelet with the equation:

$$f(t) \approx \sum_j \sum_k d_k^{(j)} \psi(2^j t - k) \quad \text{Equation (6)}$$

where the mother wavelet is an arbitrary wavelet. It may be Haar, Gabor, Spline or other type mother wavelet functions. The mother wavelet ideally would be a basic function. Coefficients, $d_k^{(j)}$ are calculated by wavelet transformation.

The function, $g(t)$ is, for example, desirable to be defined by equation (4), such that:

$$g(t) = \sum_{j=3}^{4} \sum_{k=0}^{k0} |d_k^{(j)}| \quad \text{Equation (7)}$$

Where k=0 means present time, and k0 means past time. Large k0 implies large lag and large averaging time. A large value of the function g(t) implies a large frequency component by a player.

Figure 3:
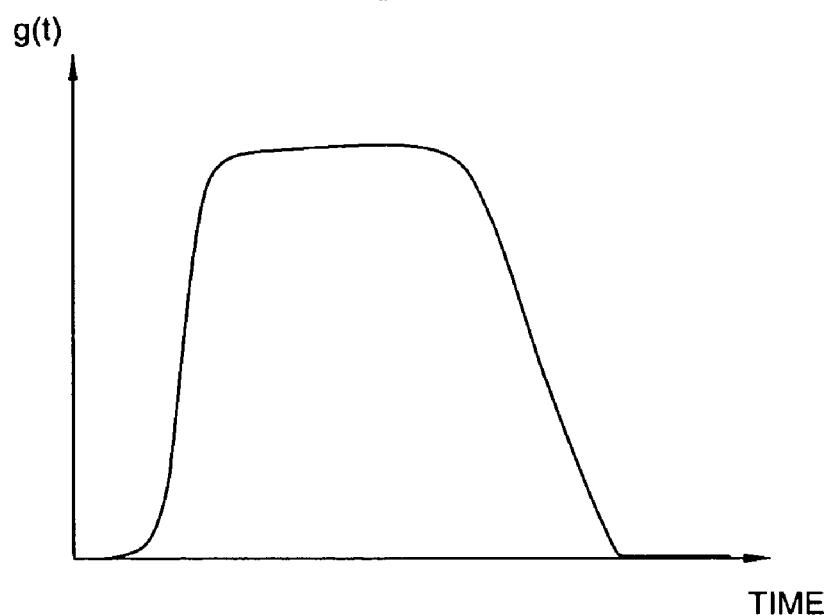
FIG. 3 is a graph illustrating an exemplary change of wavelet components over time during a program play.

FIG. 3 shows a plot of the function g(t). For generalization, equation (7) can be described as:

$$g(t) = \sum_{j=j\_start}^{j\_end} \sum_{k=k\_start}^{k\_end} |d_k^{(j)}| \quad \text{Equation (8)}$$

where $a_k^{(j)}$ is a weighting factor. Furthermore, summation index, j_start, j_end, k_start and k_end should be determined properly.

FIG. 3 plots the function g(t), based on Equation (8). It is easy to find that the function g(t) has a sensitivity of a certain ranged frequency component.

Figure 4:
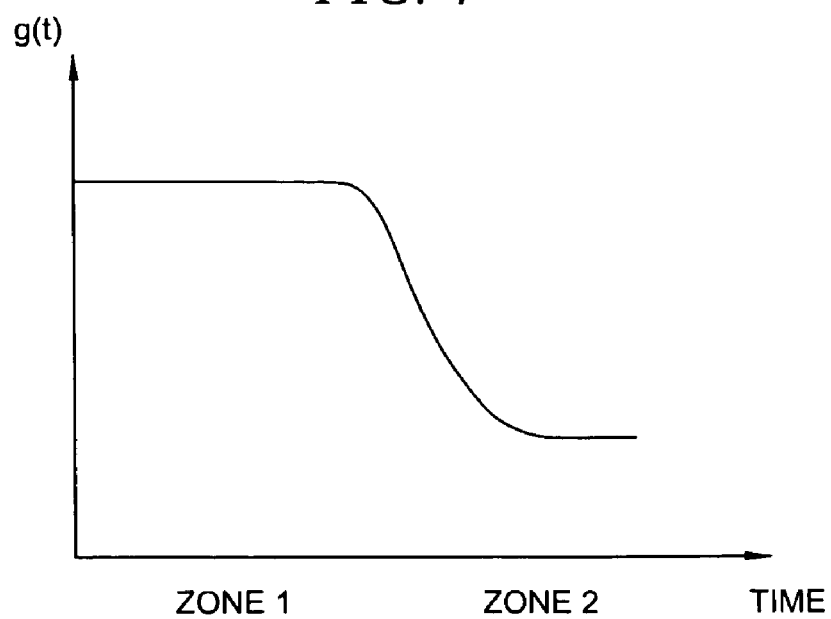
FIG. 4 depicts an example of the player's level function g(t)

FIG. 4, depicts an example of the player's level function g(t) for game. A player may initially have increased high frequency components representative of active responses during a first period of time (Zone 1). As a player tires, the high frequency component of the player's movement may decrease in comparison with the low frequency component of the player's movement (Zone 2). By analyzing the frequency components of the player's interaction with user interface 10, the computer or game console is able to determine or infer the player's response level.

Once the player's response level is determined, processor 12 may modify the system, for example by adjusting the difficulty level of the game being played. In one embodiment of the invention, this includes switching between preset difficulty levels defined in the game or to use a difficulty level that is indicated by a database or algorithm to be appropriate with the determined response level. In another embodiment, the processing system may increase or decrease the speed with which it executes the game algorithm. In a still further embodiment, the difficulty can be continuously adjusted until the user response moves within a defined range.

Figure 5:
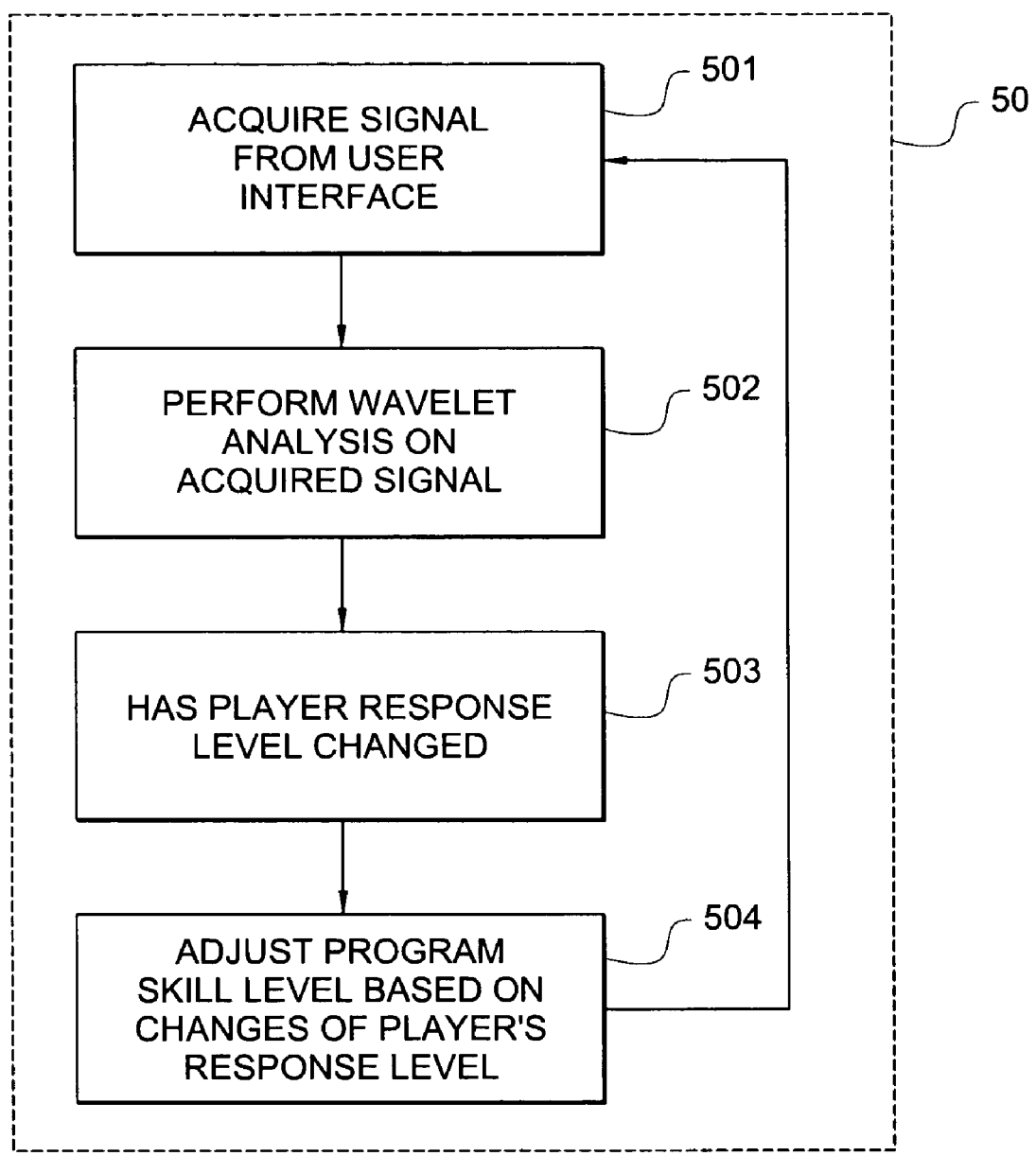
FIG. 5 illustrates a partial block diagram of one embodiment of the present invention.

FIG. 5 represents a flowchart of one embodiment 540 of the system used to adjust skill level of a game. Process 501 acquires a signal from user interface 10. Wavelet analysis of the signal, as discussed with respect to FIGS. 2A through 2F and FIG. 3, is performed by process 502 and process 503 determines if the level has changed. If it has changed from a previous reading (or a previous set of readings as stored in memory) then process 504 adjusts the skill level of the game based on the player's response level. Note that there could be a table established of user levels such that an average of highs and lows over a period of time are used to determine an actual graded level of user comfort. Based on the gradation at any point in time the same (or other program) can be adjusted harder or easier.

Note that while a game system has been described, the concepts taught herein can be used to control the operation aspects of any program running on any processor. For example, a spread sheet program can have different instructions presented based on the frequency in the input signal.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, process, machines, manufacture, compositions of matter, means, methods, or steps, presently existing or later to be developed that perform substantially the same results as the corresponding embodiments described herein may be utilized according to the present invention. Accordingly, the appended claims are intended to include within their scope such process, machines, manufacture, composition of matter, means, methods or steps.

What is claimed is:

1. A method of controlling a program running on a processor comprising:

obtaining a signal from a game controller that is controlled by a user, wherein the signal is generated by the game controller in response to an interaction between the user and the game controller that involves a movement of the game controller by the user and wherein the signal relays positional information which is used by the program to move an object on a display;

performing, via a processor, wavelet analysis on the signal that is obtained from the game controller;

determining, via the processor, the user's response level based on said wavelet analysis; and adjusting, via said processor, said program in response to a determined user response; wherein performing wavelet analysis comprises:

obtaining a high frequency component of the signal from said game controller;

obtaining a low frequency component of the signal from said game controller; and wherein said determining is based on a level of both said high and low frequency components.

2. The method of claim 1 wherein said determined response is based on a change in the obtained high frequency component.

3. The method of claim 1 wherein said determining comprises:

comparing high and low frequency components of said signal at a point in time to high and low frequency components at a different point in time.

4. The method of claim 1 wherein said program is a game program and said adjusting results in a change of a skill level presented to said user.

* * * * *